Oct. 24, 1972 R. A. BLOCH ET AL 3,700,576
ION-ACTIVITY MEASURING ELECTRODE
Filed Oct. 27, 1970

INVENTORS
RENE A. BLOCH
MORDECHAY FURMANSKY
SAUL GASSNER

*Finnegan, Henderson & Farabow*

ATTORNEYS 3,700,576
ION-ACTIVITY MEASURING ELECTRODE
René A. Bloch, Savion, Mordechay Furmansky, Petach
Tiqva, and Saul Gassner, Rehovot, Israel, assignors to
Hydronautics-Israel Ltd., Rehovot, Israel
Filed Oct. 27, 1970, Ser. No. 84,300
Claims priority, application Israel, Feb. 27, 1970,
33,983
Int. Cl. G01n 27/46
U.S. Cl. 204—195 M                                      9 Claims

ABSTRACT OF THE DISCLOSURE

A measuring electrode for the selective determination of the activity of certain ions in aqueous solutions. A holder is provided with a protruding conductor and the protruding conductor is covered by a cap removably attached to the holder. An ion-specific membrane is located over an aperture in the cap and the cap is adapted to hold a standard electrolyte solution.

---

This invention relates to measuring electrodes for the selective determination of the activity of certain ions in aqueous solutions which contain these ions in addition to other ions. The ion activity is, of course, a measure of the concentration of the ions in the given solution.

It is known that the activity of certain cations and of certain anions can be determined selectively with the aid of membranes which are selectively permeable ("permselective") towards the ion in question. Among known permselective membranes there are, for example, those which are calcium-specific, other known membranes are sodium-specific still others are chloride-specific or fluoride-specific, and their selectivity is almost complete even if the aqueous solution containing the selected ions also contians very closely related ions, such as other alkaline earth metal, alkali metal or halide ions.

Hitherto known ion measuring apparatus embodying permselective membranes have been somewhat heavy and complicated.

This invention has the object to provide a measuring electrode for the selective measurement of ion activity in aqueous solutions, which has an especially simple design.

The invention consists in a measuring electrode for the selective determination of cations or anions in aqueous solution, comprising a holder made of an electrically insulating material and including an electric conductor accessible at one end ("terminal") of the holder where it forms the electrode proper, and a removable hollow cap fitting on the terminal of the holder and including in its wall a permselective membrane.

Since the cap is removable it can be replaced when the membrane has become unserviceable. Similarly, two or more caps having membranes with different ion-specificities may be sold with one and the same holder. It is then possible to use the same electrode for different kinds of measurement by the simple exchange of the cap.

For the determination of a given specific ion the cap is filled with the appropriate standard electrolyte solution When the measurement is being made the membrane-containing tip of the electrode as well as a reference electrode are immersed in the test solution and the potential difference which then exists between the electrodes across the permselective membrane is measured by means of a voltmeter or analogous instrument inserted in the outer circuit between the electrodes. The potential difference thus determined is a function of the activity of the selected ions in the aqueous solution.

In a preferred embodiment of the invention the holder of the electrode is pencil-shaped and made of synthetic resin, and the electric conductor within the holder is a wire anchored in the mass of the holder merging into, or being connectible with, the current lead of the outer circuit of the measuring apparatus. The terminal of the holder is designed to receive the cap by means of any suitable connection, e.g. a friction joint, or an outer thread provided on a boss constituting the terminal in continuation of the holder proper for cooperation with a corresponding tapped section of the cap, a bayonet catch, a snap catch or the like.

The cap is also preferably made from synthetic resin. The permselective membrane is secured to the cap by a snap joint, as more fully described below, or by being fused into it.

The entire electrode may be very small and handy, e.g. of about 10 to 15 cm. long and 10 to 15 mm. wide.

The invention is illustrated, by way of example only, in the accompanying drawings in which.

Figure 3:
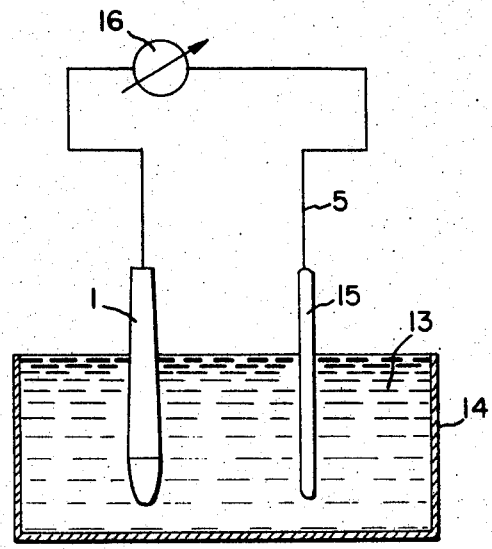
FIG. 3 is a diagrammatic representation of a measuring apparatus.

The electrode here illustrated comprises a pencil-shaped holder 1 of synthetic resin, merging at one end ("terminal") into a boss 2 provided with an outer thread 3. Anchored in the holder 1 is a metal wire 4 which projects from the terminal by an accessible length 4a, which is the electrode proper. At the opposite end of the holder (not shown) the wire merges into the current lead 5 (FIG 3) of the outer circuit of the apparatus which is a conventional insulated wire.

Screwed onto the boss is a cap 6 for holding a quantity of standard electrolyte solution and which tapers at its free end where it has an aperture 7. The latter is sealed by a plug 8 with axial bore 9 and carried at the free end of the bore a permselective membrane 10. As here illustrated, the plug 8 has a collar 11 which, when the cap is assembed, snaps into an annular groove 12 provided in the tapering part of the cap 6. Instead, the plug 8 may be heat-sealed into the cap 6.

Before assembly, the cap is filled with the standard electrolyte solution so that the protruding end 4a of the wire 4 is immersed into the solution when the cap is screwed onto the holder.

For effecting a measuring of the activity of the selected ions, the measuring electrode as well as a reference electrode 15 are immersed in the test solution 13 contained in a beaker or vat 14. The outer circuit 5 between the measuring and reference electrodes includes a voltmeter 16, which indicates the potential difference between the two electrodes.

The invention is illustrated by the following examples to which it is not limited.

EXAMPLE 1

Figure 2:
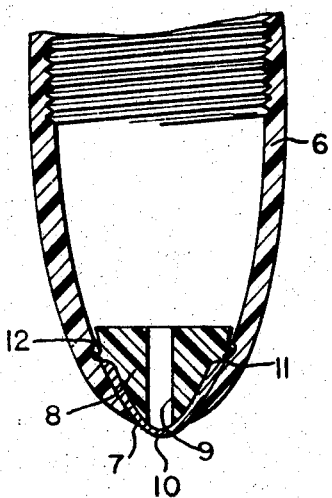
FIG. 2 is a fragmentary axial section, on a larger scale, of the cap.
Figure 1:
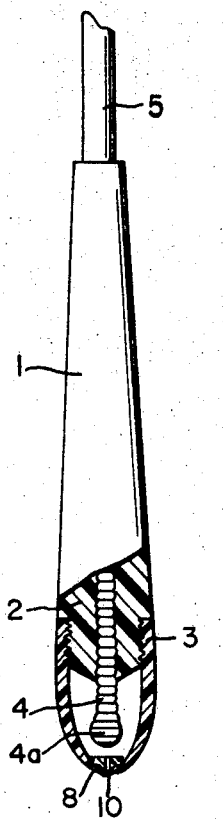
FIG. 1 is a fragmentary axial section of an electrode according to the invention.

A potassium-specific membrane was prepared by plasticizing a porous membrane of cellulose acetate, having a weak negative charge imparted to it by grafted-on carboxyl groups in accordance with copending application Ser. No. 40,350, filed May 25, 1970, which is assigned to the same assignee as the present application, with an 0.08% solution of valinomycin in dibutyl sebactate. The membrane was mounted in the electrode cap in the manner shown in FIG. 2. The cap was filled with a $10^{-3}$ molar aqueous solution of potassium chloride as standard. The electrode proper 4a (FIG. 1) was a silver-silver chloride standard electrode.

The reference electrode was a conventional calomel electrode. The instrument 16 was a millivolt meter. The reading produced a Nernst potential curve with correct slope in the range of potassium concentrations of $10^{-5}$ to 1 molar. The selectivity of the membrane for potassium in the presence of sodium, calcium, magnesium and ammonium ions was excellent. The electrode was in use for 35 days, whereafter the slope of the Nernst curve decreased. The cap was then replaced by a new one of the same kind by a simple and quick manipulation, whereby the original selectivity and sensitivity of the electrode was restored.

EXAMPLE 2

A calcium-specific membrane was prepared as a thin film by the evaporation of the solvent from a thin layer of a 10% cyclohexane solution of polyvinyl chloride, tributylphosphate and fluoroyltrifluoroacetone in the weight ratio 1:3:1. The membrane was fixed on the electrode cap which was then filled with a $10^{-3}$ molar aqueous solution of calcium chloride, whereafter the electrode cap was attached to the electrode holder. The measuring apparatus was the same as described in Example 1.

With aqueous calcium chloride solutions a correct Nernst curve ("working range") was obtained with concentrations in the range of $10^{-5}$–1 molar. The selectivity with respect to sodium, potassium, magnesium and barium ions present in the solution was excellent. The electrode performance deteriorated after 22 days of continuous use.

EXAMPLE 3

A chloride-specific membrane was prepared by spreading a layer of dispersion of silver chloride in siloxane on a glass plate and curing it. The membrane was mounted on an electrode cap. Measurements performed as described in Example 1 showed that the electrode had a working range of $10^{-6}$ to 1 molar and that its selectivity for chloride ions with respect to bromide, iodide and nitrate ions was excellent. The life time of the membrane varied between 9 days and 2 months.

EXAMPLE 4

An iodide-specific membrane was prepared by the same procedure as in Example 3, with silver iodide instead of silver chloride. The working range and selectivity were similar to those of the chloride-specific membrane of Example 3 but the life time of the membrane was only 12 days.

We claim:
1. A measuring electrode asembly for ion-activity measurements comprising:
 (a) a solid, electrically insulated holder;
 (b) an electrical conductor embedded within the holder and having only an outer tip exposed for contact with an electrolyte solution said tip projecting beyond one end of the holder;
 (c) a cap forming a single reservoir in its interior space for holding the entire quantity of a standard electrolyte solution for the electrode assembly, said cap being removably interconnected to the holder behind the projecting tip, whereby the exposed tip of the conductor is immersed within the electrolyte solution and having an aperture in the bottom of the cap and an annular groove around the interior surface of the cap spaced from said aperature;
 (d) an ion-specific membrane covering the aperture; and
 (e) a plug having an annular collar lockingly engaging the groove in the cap to hold the membrane in place over the aperture, said plug having a bore therethrough to connect the membrane with the solution in the cap.

2. A measuring electrode as in claim 1, wherein the cap is threadably connected to the holder.

3. The measuring electrode of claim 1, wherein the holder is pencil-shaped and made of synthetic resin, and the electric conductor is a wire anchored in the mass of the holder and connected with the current lead of a measuring apparatus.

4. The measuring electrode of claim 1, wherein the cap is made from synthetic resin.

5. The measuring electrode of claim 1, wherein the membrane is calcium specific.

6. The measuring electrode of claim 1, wherein the membrane is potassium specific.

7. The measuring electrode of claim 1, wherein the membrane is sodium specific.

8. The measuring electrode of claim 1, wherein the membrane is chloride specific.

9. The measuring electrode of claim 1, wherein the membrane is iodide specific.

References Cited

UNITED STATES PATENTS

| | | | |
|---|---|---|---|
| 3,211,638 | 10/1965 | Halvorsen | 204—195 P |
| 3,398,066 | 8/1968 | Ilani | 204—1 T |
| 3,429,785 | 2/1969 | Ross | 204—195 L |
| 3,431,182 | 3/1969 | Frant | 204—195 M |
| 3,467,590 | 9/1969 | Gibson et al. | 204—195 L |
| 3,510,421 | 5/1970 | Gealt | 204—195 P |
| 3,563,874 | 2/1971 | Ross et al. | 204—195 M |

TA-HSUNG TUNG, Primary Examiner

U.S. Cl. X.R.

204—195 L